US006272677B1

(12) United States Patent
Lam et al.

(10) Patent No.: US 6,272,677 B1
(45) Date of Patent: Aug. 7, 2001

(54) METHOD AND SYSTEM FOR AUTOMATIC DETECTION AND DISTRIBUTION OF CODE VERSION UPDATES

(75) Inventors: An Ngoc Lam; Vinh-Thuan Nguyen-Phuc, both of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/141,635

(22) Filed: Aug. 28, 1998

(51) Int. Cl.[7] .................................................. G06F 9/445
(52) U.S. Cl. ................... 717/11; 717/5; 707/203; 709/201
(58) Field of Search ................... 717/11, 5; 395/712, 395/705; 702/203; 709/201

(56) References Cited

U.S. PATENT DOCUMENTS

| | | | |
|---|---|---|---|
| 5,278,979 | 1/1994 | Foster et al. ......................... | 395/600 |
| 5,280,612 | 1/1994 | Lorie et al. .......................... | 395/600 |
| 5,359,730 | 10/1994 | Marron ................................ | 395/650 |
| 5,421,012 | 5/1995 | Khoyi et al. ......................... | 395/650 |
| 5,574,898 | 11/1996 | Leblang et al. ..................... | 395/601 |
| 5,574,906 | 11/1996 | Morris ................................ | 395/601 |
| 5,634,052 | 5/1997 | Morris ................................ | 395/601 |
| 5,649,200 | 7/1997 | Leblang et al. ..................... | 395/703 |
| 5,732,275 * | 3/1998 | Kullick et al. ........................ | 717/11 |
| 5,742,829 * | 4/1998 | Davis et al. ........................ | 717/11 |
| 5,761,499 * | 6/1998 | Sonderegger ......................... | 707/10 |
| 5,764,992 * | 6/1998 | Kullick et al. ........................ | 717/11 |
| 5,778,231 * | 7/1998 | Hoff et al. .............................. | 717/5 |
| 5,835,911 * | 11/1998 | Nakagawa et al. .................. | 707/203 |
| 5,919,247 * | 7/1999 | Hoff et al. ............................ | 709/217 |
| 5,923,885 * | 7/1999 | Johnson et al. ...................... | 717/11 |
| 5,966,540 * | 10/1999 | Lister et al. .......................... | 717/11 |
| 5,995,756 * | 11/1999 | Herrmann ............................ | 717/11 |
| 6,006,035 * | 12/1999 | Nabahi ................................ | 717/11 |
| 6,047,054 * | 4/2000 | Bayless et al. ....................... | 379/202 |
| 6,088,717 * | 7/2000 | Reed et al. ........................... | 709/201 |
| 6,151,643 * | 11/2000 | Cheng et al. ......................... | 710/36 |
| 6,167,567 * | 12/2000 | Chiles et al. ......................... | 717/11 |

FOREIGN PATENT DOCUMENTS

| | | | |
|---|---|---|---|
| 752647A | 8/1997 | (EP) | G06F/9/44 |

OTHER PUBLICATIONS

"Automatic Program Reordering for Data References in Unified Cache", *IBM Technical Disclosure Bulletin*, vol. 39, No. 04, Apr. 1996.

"Java Dynamic Class Loader", *IBM Technical Dislcosure Bulletin*, vol. 39, No. 11, Nov. 1996.

* cited by examiner

*Primary Examiner*—Kakali Chaki
*Assistant Examiner*—Chameli C. Das
(74) *Attorney, Agent, or Firm*—Sawyer Law Group LLP; Noreen A. Krall

(57) ABSTRACT

Aspects for automatic code version update detection and distribution for an application program running on a computer system in a computer network are described. In a method aspect, the method includes providing two agent processes, a slave agent and a master agent, on an agent system in the computer network. A request is received in the slave agent from a manager system in the computer network, the request including an appropriate code version of the running application for response. A determination of whether the slave agent can fulfill the request at the appropriate code version is made, and an automatic updating of the agent system occurs when the request cannot be fulfilled at the appropriate code version. In a further method aspect, two agent processes, a slave agent and a master agent, are provided on an agent system, with identification of whether the agent system is operating at an appropriate code version occurring during discovery and registration of the agent system in a manager system, and automatic updating of the agent system when the agent system is not operating at the appropriate code version.

29 Claims, 7 Drawing Sheets

METHOD AND SYSTEM FOR AUTOMATIC DETECTION AND DISTRIBUTION OF CODE VERSION UPDATES

FIELD OF THE INVENTION

The present invention relates to application code versions, and more particularly to dynamically updating code versions for running applications.

BACKGROUND OF THE INVENTION

Application programs on distributed computer systems in a network are generally based upon the concept of a central manager which resides on a server, exchanging information with agents on remote machines within the network. The installation of agents in such an application environment typically either requires the manual distribution of storage media (e.g., CD-ROMs, or diskettes) on which the agent and its corresponding installation package reside, or the placement of the agent install package on a server for downloading. Utilizing manual distribution results in time-consuming administrative procedures associated with the distribution of the agent's physical storage media. Even greater time is needed due to the heterogeneous network environment that includes systems with differing operating systems, thus requiring multiple versions of the agent software.

While utilizing a server does alleviate some of the distribution difficulties of a manual approach, it is not without problems. The efforts to place the install package on the server remains a somewhat manual administrative procedure, where the procedure typically varies among networks and is prone to human error. Further, the use of a server does not guard against code versioning problems, which result when the application's multiple agents potentially have been downloaded at varying times and are not all the latest version of code.

Thus, software distribution and installation remain concerns for both vendors and customers. Recent Internet and Web technology reemphasize a dynamic approach for software updating in applications by allowing replacement of loaded class files at any time. Wide use is made of this feature in the Internet browser environment, where the latest data files, Web pages, images, etc., are downloaded from a Web server to the Browser client when the client makes a request. However, it is difficult to implement dynamic distribution for non-browser Java applications and applets, since the new class files or modules do not take effect until the next time the Java Virtual Machine (JVM) running on the computer system is started. Further, 'loaded' native libraries, (e.g., files *.dll, *.nlm, *.so, *.sl, etc.), are normally locked by the operating system when they are loaded into memory and thus cannot be replaced. Therefore, most current Java applications detect old code versions and perform updates only when the applications are started, not when the applications are running.

Accordingly, a need exists for dynamic updating of a code version for a Java application. The present invention addresses such a need.

SUMMARY OF THE INVENTION

The present invention provides aspects for automatic code version update detection and distribution for an application program running on a computer system in a computer network. In a method aspect, the method includes providing two agent processes, a slave agent and a master agent, on an agent system in the computer network. The two agents capably communicate via process-to-process communication, for example, by listening for requests on each of two ports for TCP/IP communication. The master agent comprises a thin code layer of control functionality, while the slave agent comprises a thick code layer of traditional application functionality. A request is received in the slave agent from a manager system in the computer network, the request including an appropriate code version of the running application for response. A determination of whether the slave agent can fulfill the request at the appropriate code version is made, and an automatic updating of the agent system occurs when the request cannot be fulfilled at the appropriate code version. In a further method aspect, two agent processes, a slave agent and a master agent, are provided on an agent system, with identification of whether the agent system is operating at an appropriate code version occurring during discovery and registration of the agent system in a manager system, and automatic updating of the agent system when the agent system is not operating at the appropriate code version.

Through the present invention, manager systems can detect old code versions and update agent systems while the applications are running on the agent systems, not merely when the applications are started. Such capability achieves significant reduction in manual administrative overhead when issuing new code versions on a distributed computer network. Further, the present invention is readily implemented on most standard operating systems and in conjunction with common features of Java. These and other advantages of the aspects of the present invention will be more fully understood in conjunction with the following detailed description and accompanying drawings.

DETAILED DESCRIPTION OF THE INVENTION

The present invention relates to dynamic code version updates in running Java application programs. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Further, the present invention is described in a preferred embodiment as being implemented in accordance with Java™ object-oriented programming techniques. However, it should be appreciated that the aspects of the present invention may be achieved in other programming environments that provide substantially equivalent functionality, as is well appreciated by those skilled in the art.

Figure 1A:
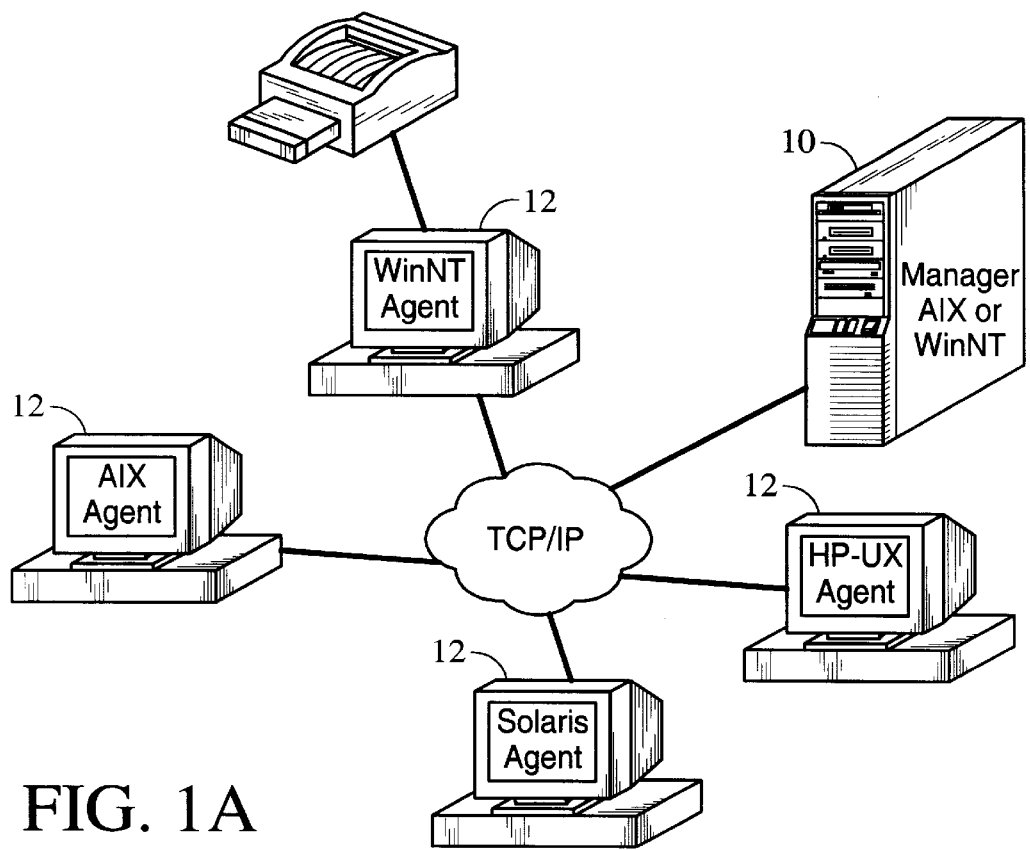
FIGS. 1A and 1B illustrate a network system diagram in accordance with the present invention.

FIG. 1A illustrates a diagram representation of a suitable computer network arrangement that includes one or more manager systems 10 coupled to a plurality of agent systems 12. For example, a manager system may be responsible for monitoring the storage resource status in the agents via a chosen Java-based application program. The manager(s) 10 may be differing types of computer systems, such as computer systems operating under AIX, OS/390, or NT, as is well understood by those skilled in the art. Further, a number of platforms, e.g., standardly known platforms of OS/390, OS/2, AIX, Solaris, HP-UX, Win NT, and Irix, have been found to work well for the agent(s) 12 for utilization of dynamically updating in accordance with the present invention. Of course, the platforms listed herein are meant as illustrative examples of suitable platforms. Other platforms may be utilized as desired for particular design needs, as is well understood by those skilled in the art.

Figure 1B:
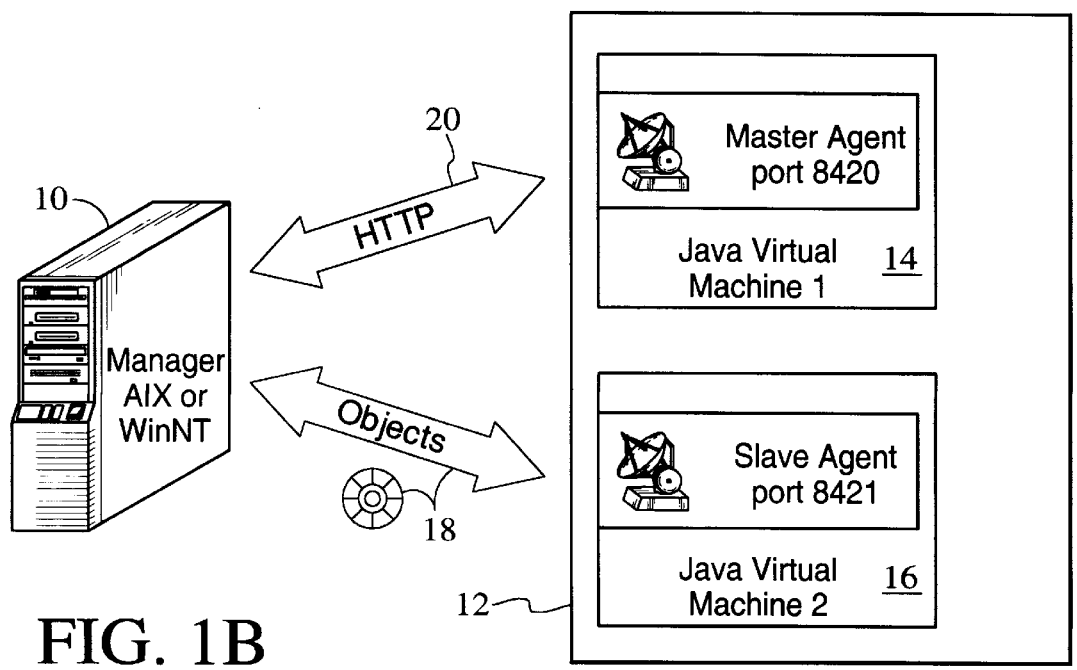

In order to achieve the dynamic updating of a code version in the agent 12, preferably the agent 12 includes two different processes/layers: a thin 'master' agent layer 14 that acts as a controller agent and has limited functions; and a thick 'slave' agent layer 16 that contains most of the application functions, as represented for illustrative purposes by agent 12, FIG. 1B. Suitably, when the agent 12 application is started, two different processes, i.e., master agent 14 and slave agent 16, are started, thus starting two independent Java Virtual Machines (JVMs), as is well appreciated by those skilled in the art, and which are shown as Java Virtual Machine 1 and Java Virtual Machine 2 in FIG. 1B. Since the slave agent 16 performs most of the application functionality, most of the requests come to the slave agent 16. By way of example, the managers 10 suitably communicate with the agent 12 via serialized objects 18 for the slave agent 16 with communication in accordance with HTTP (hypertext transfer protocol) 20 for the master agent 14. Of course, other communication protocols may be suitable depending upon design needs, as is well appreciated by those skilled in the art. Preferably, the master agent 14 and slave agent 16 communicate via separate ports of the agent 12, as shown.

The automatic detection and distribution of updated code version level for an agent system in accordance with an exemplary embodiment of the present invention is described with reference to the flow diagram of FIG. 2 in conjunction with system diagrams in FIGS. 3A–3J. The process for dynamic code version updating initiates when a manager 10 communicates with agent 12. By way of example, one form of communication occurs when the managers 10 perform a suitable discovery routine to establish a set of known agents and their current code version level, such as the discovery routine described in U.S. patent application, entitled METHOD FOR DISCOVERING AND REGISTERING AGENTS IN A DISTRIBUTED NETWORK, Ser. No. 09/121,552, and assigned to the assignee of the present invention. If the code version in the agent 12 does not match an appropriate code version, as determined by the manager 10, the update procedure commences in the agent 12, as described more fully with reference to steps 30, 36, 38, 40, 44, 46, 48, and 50 of FIG. 2, hereinbelow.

Figure 2:
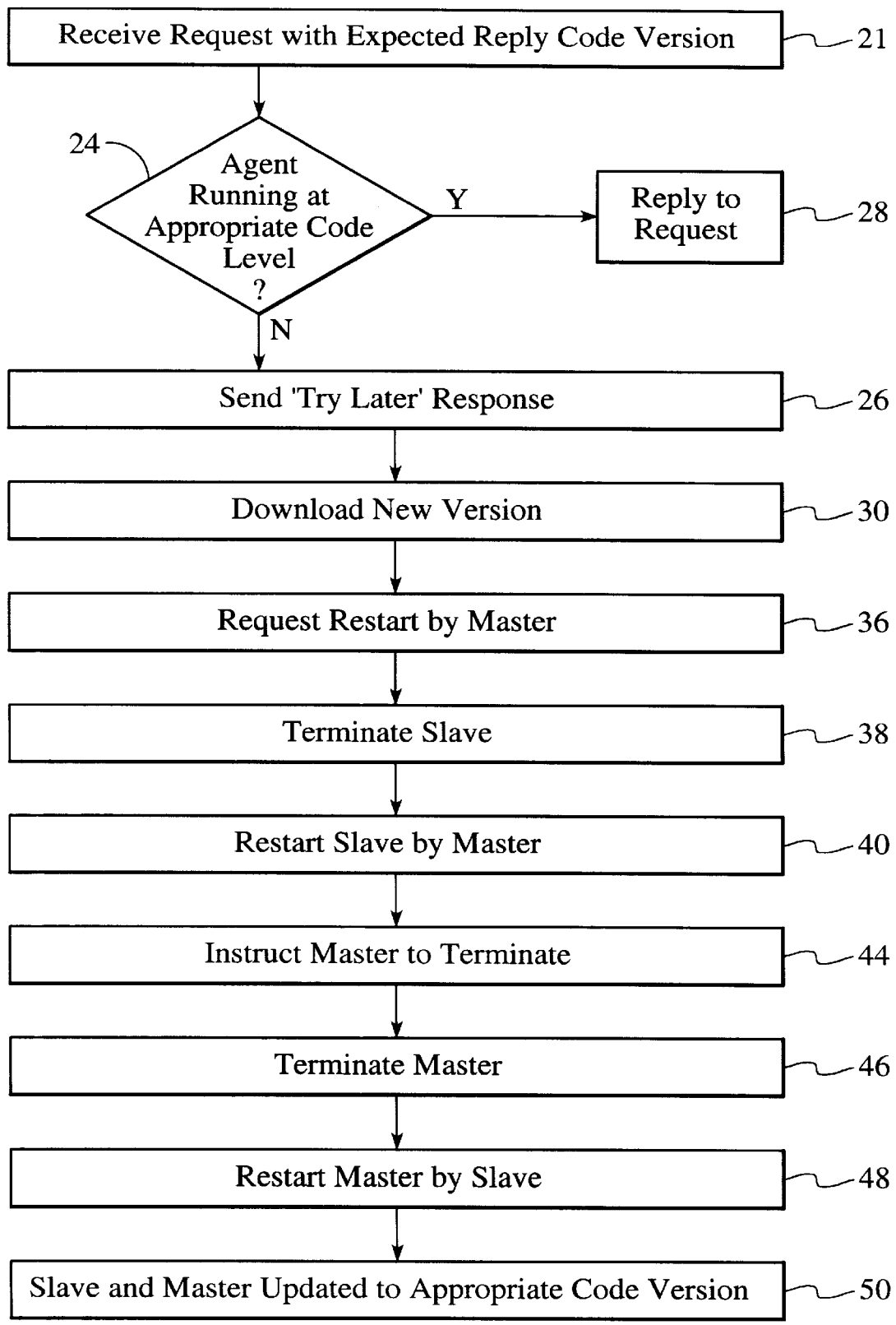
FIG. 2 illustrates a block flow diagram for dynamic code updating in accordance with the present invention.

Another form of communication occurs when the manager 10 sends a request to the agent 12 (service provider) (step 21, FIG. 2). A request 22, FIG. 3A, preferably contains not only the requested function and its parameters but also contains the expected code version service level and the name of the file server where the expected code version resides for downloading, if necessary.

Figure 3A:
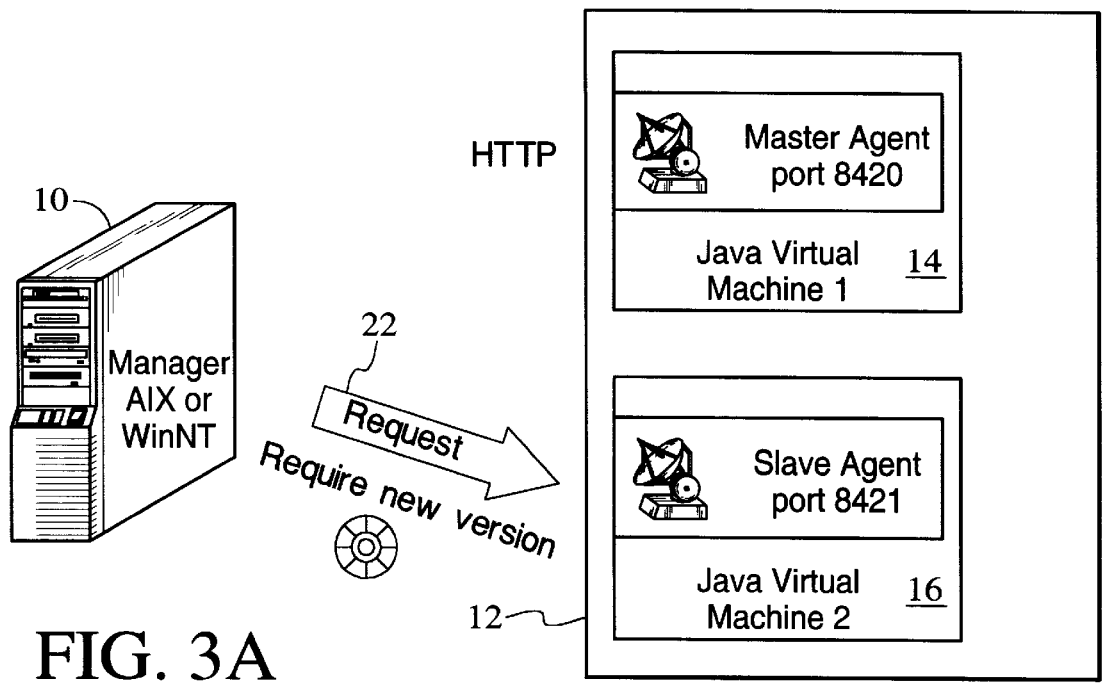
FIGS. 3A, 3B, 3C, 3D, 3E, 3F, 3G, 3H, 3I, and 3J illustrate the system of FIG. 1B during selected steps of the process shown in FIG. 2.
Figure 3B:
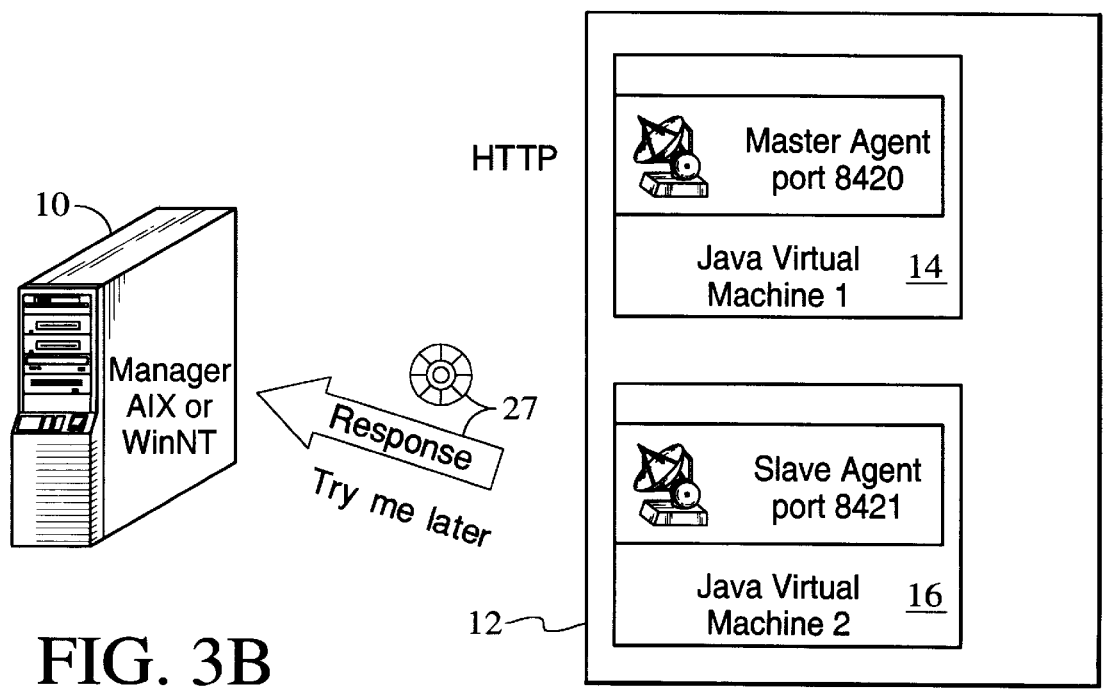

When the slave agent 16 receives the request 22 that requires a code version level that the slave agent 16 does not have, as determined via step 24, FIG. 2, the slave agent 16 responds with a 'try later' response (step 26, FIG. 2; response 27, FIG. 3B). When the slave agent 16 does contain the right code version, the request is fulfilled (step 28, FIG. 2).

Figure 3C:
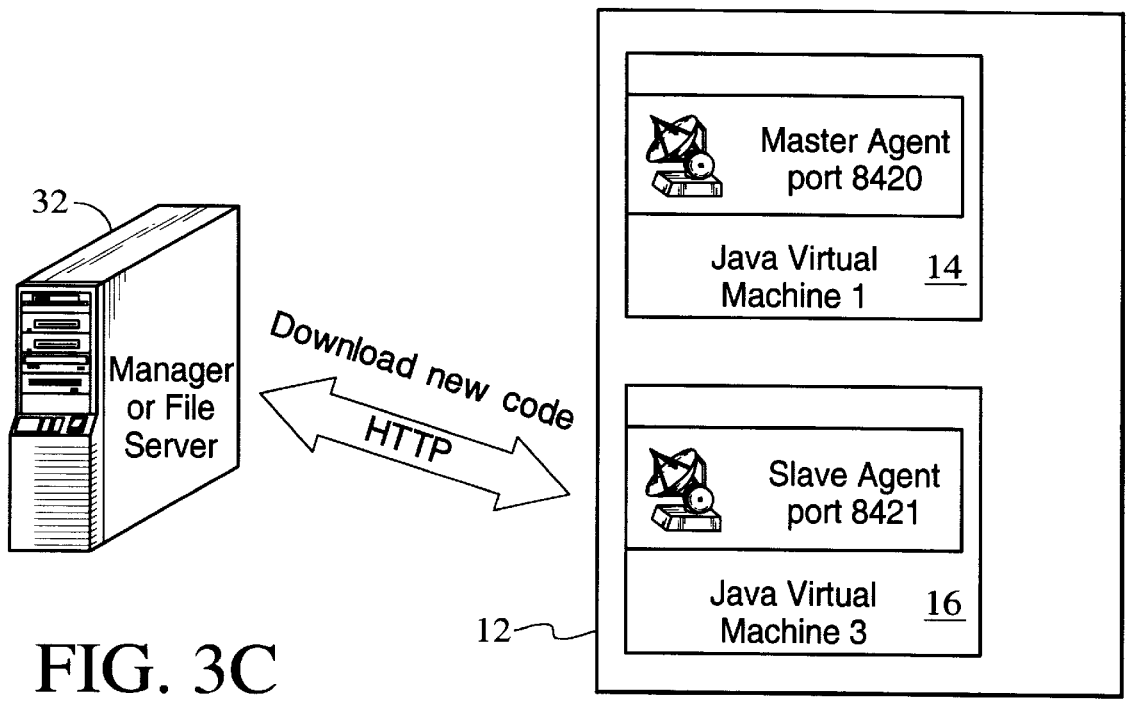
Figure 3D:
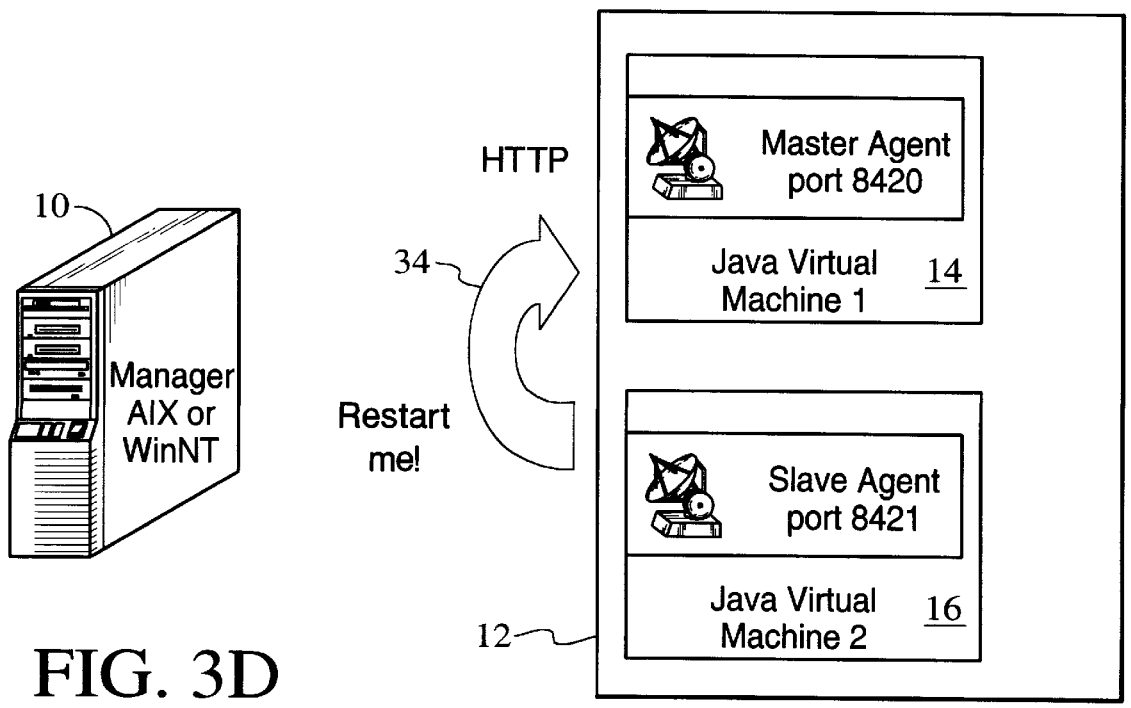
Figure 3E:
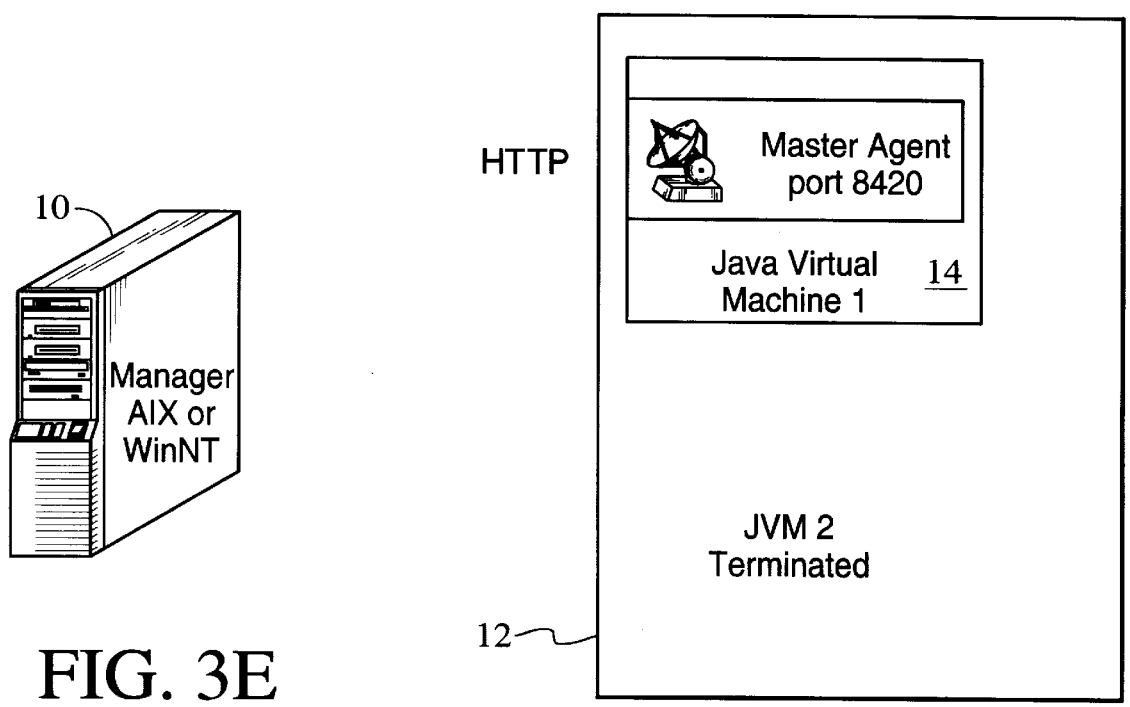
Figure 3F:
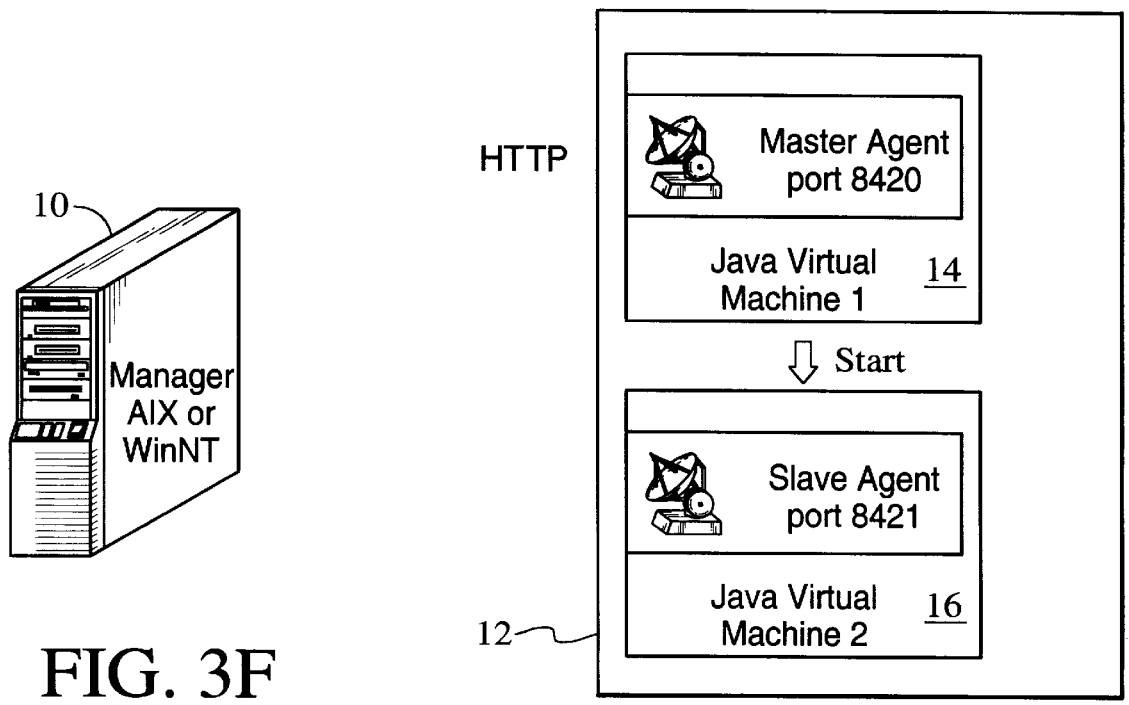
Figure 3G:
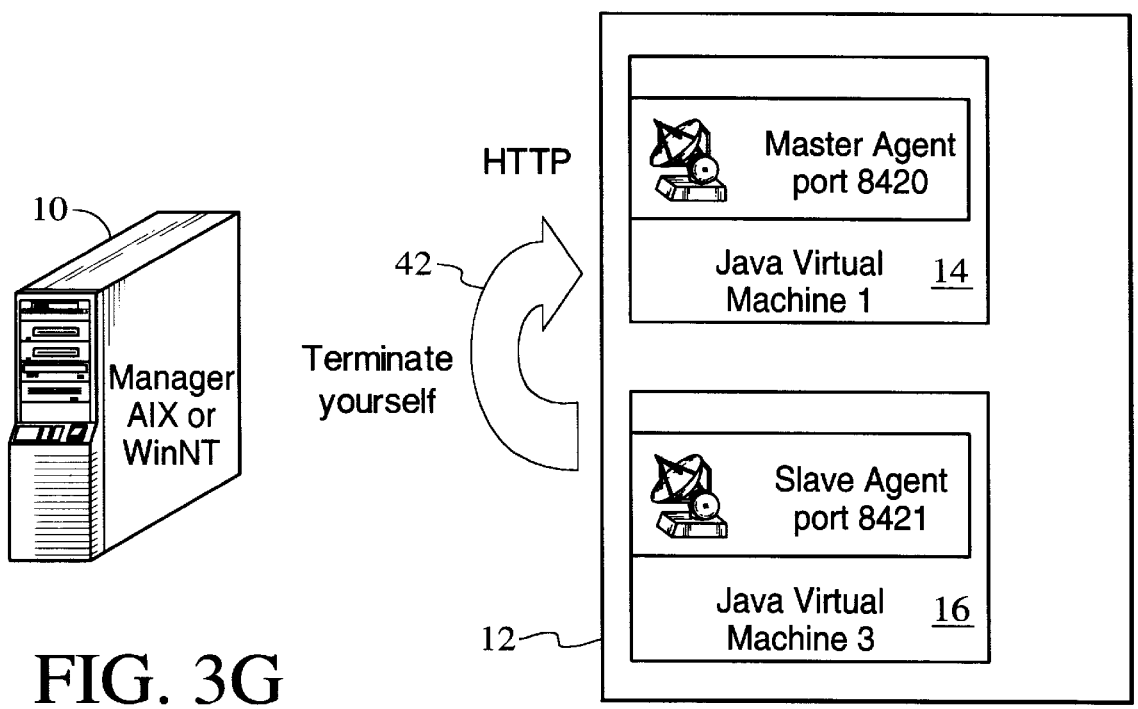
Figure 3H:
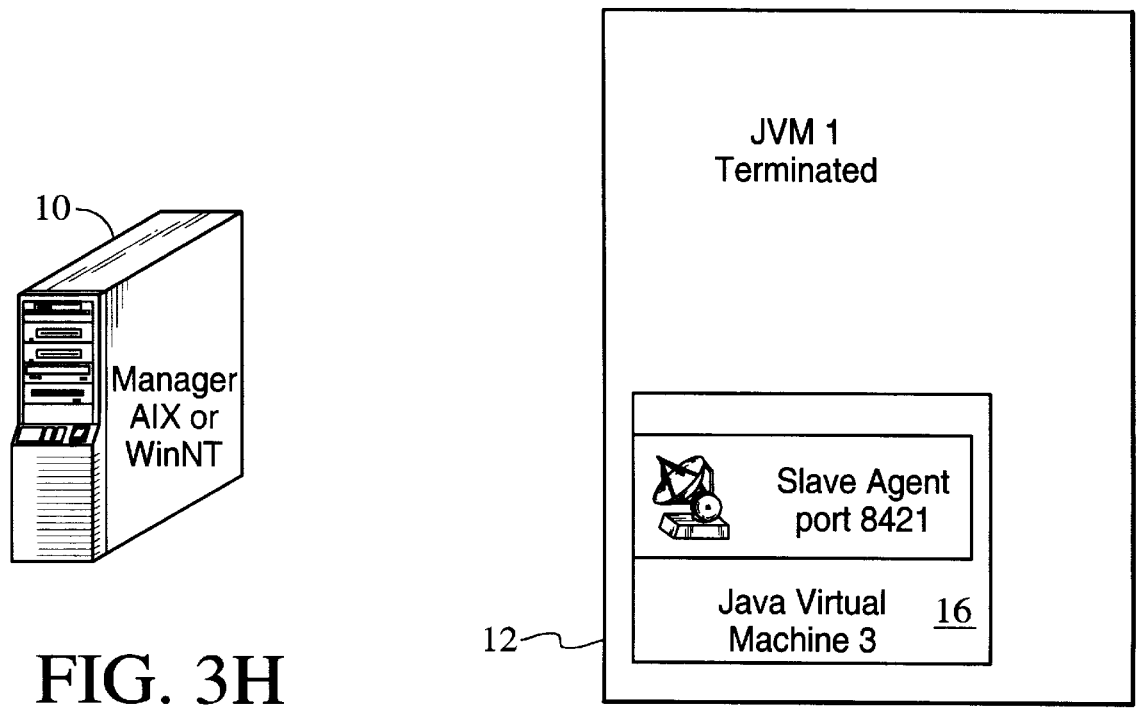
Figure 3I:
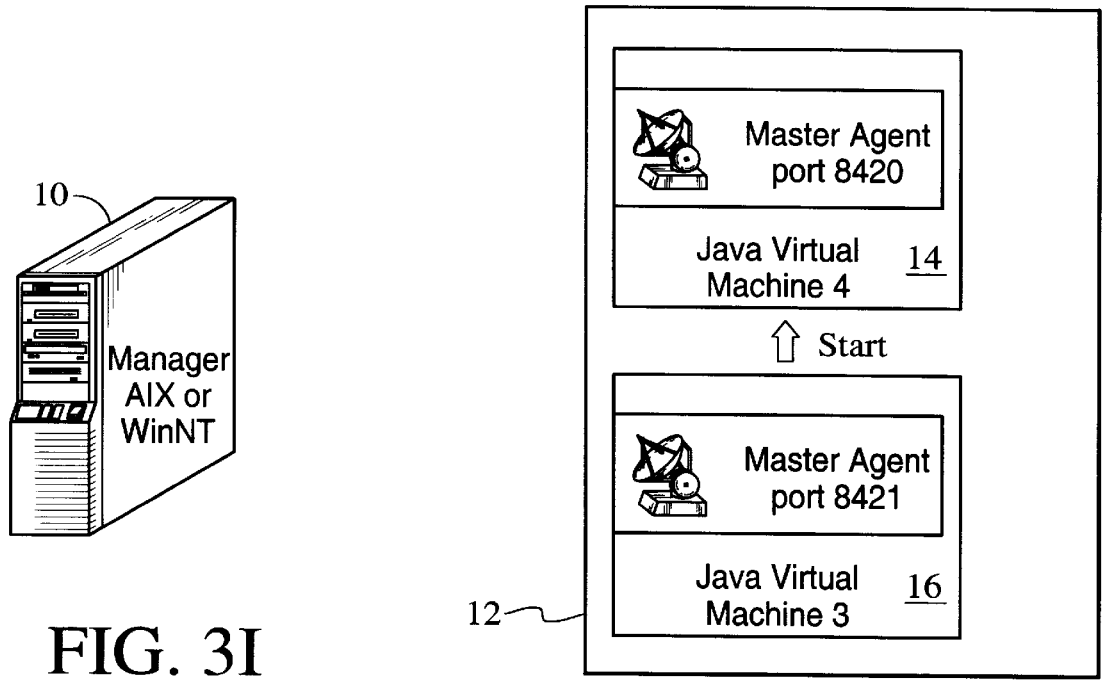
Figure 3J:
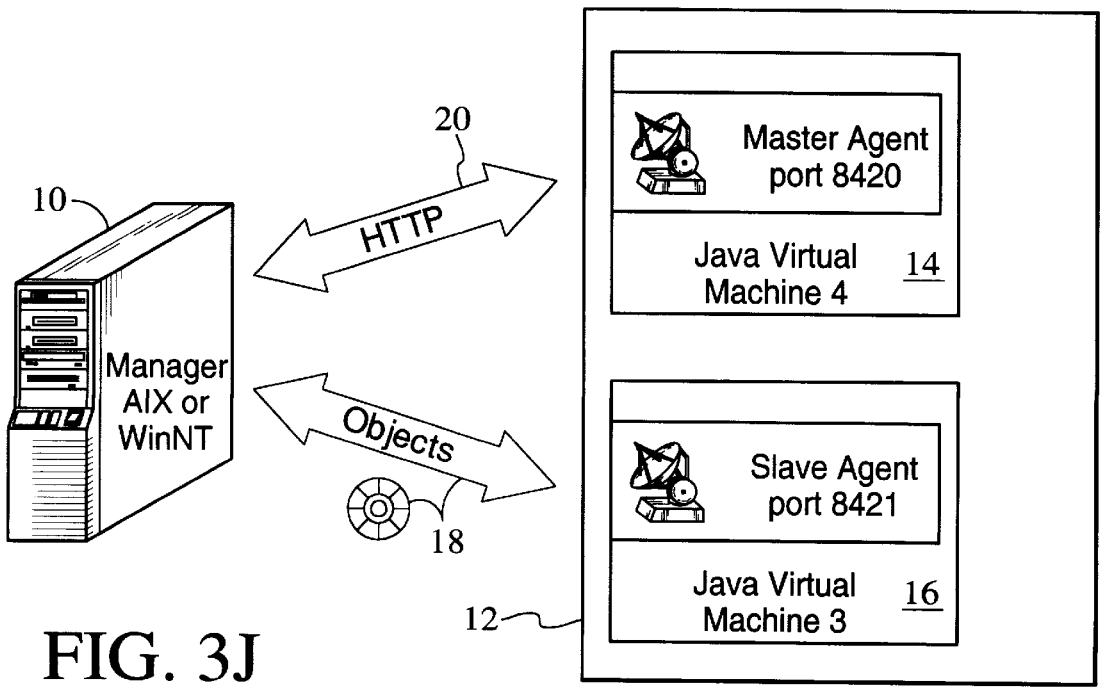

When the 'try later' response has been sent, the slave agent 16 then downloads the required code version from the appropriate server 32 (step 30, FIG. 2; diagram FIG. 3C). The appropriate server 32 may be suitably indicated in the communication from the manager 10 to the agent system 12, such as in the request 22. The downloading updates the classes, as is capable via the class files feature of Java, and the updated native libraries are held in a temporary storage directory. Since the native libraries cannot be updated until the program is restarted, the slave agent 16 sends a request 34 to the master agent 14 for a restart (step 36, FIG. 2; diagram FIG. 3D). The slave agent 16 then terminates itself (step 38, FIG. 2), resulting in termination of the slave agent process 16 and associated JVM (e.g., Java Virtual Machine 2, FIG. 3E). After an appropriate delay for termination, the master agent 14 initiates the starting sequence for the slave agent 16 (step 40, FIG. 2, diagram FIG. 3F), which causes replacement of the native libraries by the updated native libraries stored in the temporary storage directory. When the slave agent 16 is up and running, the new level of classes and native libraries are fully loaded with the start of a new JVM, shown as Java Virtual Machine 3 in FIG. 3F.

Although the new code version is downloaded and active in the slave agent 16, the master agent 14 is still running at the old level and executing modules that were previously loaded for the Java Virtual Machine 1. The slave agent 16 notifies the master agent 14 to shutdown itself via message 42, so that the slave agent 16 can restart the master agent 14 (step 44, FIG. 2; diagram FIG. 3G). The master agent 16 then terminates itself (step 46, FIG. 2; diagram FIG. 3H). The slave agent 16 then appropriately restarts the master agent 14 (step 48, FIG. 2; diagram FIG. 3I). After the master agent 14 is restarted with a new JVM, Java Virtual Machine 4 in FIG. 3I, both the master agent 14 and server agent 16 are running with the new level of code and are ready to respond to manager requests at the proper code version level (step 50, FIG. 2; diagram FIG. 3J). Thus, the present invention dynamically achieves code version updating on a running application in an agent. Any code version updates in a manager are readily provided to agent systems without incurring problems and costs associated with common manual/human distribution techniques.

Of course, preferably the manager/agent requests are checked for correct authentication. Security mechanisms, such as signed object, certificate of authentication, message digest, etc., that the Java Development Kit (JDK) 1.1.x from Sun Microsystems, Inc., Mountain View, Calif., supports, can be used with the present invention to provide a 'trusted' environment.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for automatic code version update detection and distribution for an application program running on a computer system in a computer network, the method comprising:

providing two agent processes, a slave agent and a master agent, on an agent system in the computer network;

receiving a request in the slave agent from a manager system in the computer network, the request including an appropriate code version of the running application for response;

determining whether the slave agent can fulfill the request at the appropriate code version; and automatically updating the agent system when the request cannot be fulfilled at the appropriate code version.

2. The method of claim 1 wherein automatically updating further comprises sending a response to the manager system to try the request for the agent system later.

3. The method of claim 2 wherein automatically updating further comprises downloading the appropriate code version from a source system in the computer network, the source system indicated in the request.

4. The method of claim 3 wherein automatically updating further comprises updating classes associated with the appropriate code version in the slave agent and storing native libraries associated with the appropriate code version in a temporary directory storage of the agent system.

5. The method of claim 4 wherein automatically updating further comprises sending a restart request from the slave agent to the master agent, terminating the slave agent, and restarting the slave agent by the master agent to establish the appropriate code version for the slave agent.

6. The method of claim 5 wherein automatically updating further comprises sending a terminate message to the master agent from the slave agent, terminating the master agent, and restarting the master agent by the slave agent to establish the appropriate code version for the master agent.

7. The method of claim 5 wherein restarting the slave agent comprises starting a new Java Virtual Machine.

8. The method of claim 6 wherein restarting the master agent comprises starting a new Java Virtual Machine.

9. A computer network system that achieves automatic code version detection and distribution, the computer network system comprising:

one or more manager systems; and one or more agent systems coupled to the one or more manager systems, each agent system comprising at least two processes that include a slave agent and a master agent, each agent system receiving requests in the slave agent from the one or more manager systems and automatically updating the agent system for a running application when a desired code version in the received request does not match a current code version in the agent system receiving the request.

10. The system of claim 9 wherein the receiving agent system automatically updates by sending a response to the manager system to try the request for the agent system later and downloading the desired code version from a source system in the computer network, the source system indicated in the request.

11. The system of claim 10 wherein the receiving agent system automatically updates by updating classes associated with the desired code version in the slave agent and storing native libraries associated with the desired code version in a temporary storage directory of the agent system.

12. The system of claim 11 wherein the receiving agent system automatically updates by sending a restart request from the slave agent to the m aster agent, terminating the slave agent, and restarting the slave agent by the master agent to establish the desired code version for the slave agent.

13. The system of claim 12 wherein automatically updating further comprises sending a terminate message to the master agent from the slave agent, terminating the master agent, and restarting the master agent by the slave agent to establish the desired code version for the master agent.

14. A computer network system that achieves automatic code version detection and distribution, the computer network system comprising:

at least one agent system running a Java-based application program at a current code version level through two agent processes; and at least one manager system determining whether the at least one agent system is operating with a desired code version level, the at least one agent system dynamically updating to the desired code version level when the current code version level does not match the desired code version level.

15. The system of claim 14 wherein the at least one manager system determines whether the at least one agent system is operating with a desired code version based on the current code version identified by the at least one agent system during discovery and registration of the at least one agent system in the at least one manager system.

16. The system of claim 14 wherein the at least one manager system determines whether the at least one agent system is operating with a desired code version by sending a request to the at least one agent system with the desired code version level for a response.

17. The system of claim 16 wherein the two agent processes comprise a master agent and a slave agent.

18. The system of claim 17 wherein communication with the master agent and the slave agent occurs via separate ports in the at least one agent system.

19. The system of claim 17 wherein the master agent and the slave agent each run under separate Java Virtual Machines.

20. The system of claim 17 wherein the slave agent receives the request from the at least one manager system.

21. The system of claim 20 wherein the request comprises a serialized object.

22. The system of claim 20 wherein the request further comprises an indicator of a downloadable source for the desired code version level.

23. A method for automatic code version update detection and distribution for an application program running on a computer system in a computer network, the method comprising:

providing two agent processes, a slave agent and a master agent, on an agent system in the computer network;

identifying whether the agent system is operating at an appropriate code version during discovery and registration of the agent system in a manager system of the computer network; and automatically updating the agent system when the agent system is not operating at the appropriate code version.

24. The method of claim 23 wherein automatically updating further comprises downloading the appropriate code version from a source system in the computer network.

25. The method of claim 24 wherein automatically updating further comprises updating classes associated with the appropriate code version in the slave agent and storing native libraries associated with the appropriate code version in a temporary directory storage of the agent system.

26. The method of claim 25 wherein automatically updating further comprises sending a restart request from the slave agent to the master agent, terminating the slave agent, and restarting the slave agent by the master agent to establish the appropriate code version for the slave agent.

27. The method of claim 26 wherein automatically updating further comprises sending a terminate message to the master agent from the slave agent, terminating the master agent, and restarting the master agent by the slave agent to establish the appropriate code version for the master agent.

28. The method of claim 26 wherein restarting the slave agent comprises starting a new Java Virtual Machine.

29. The method of claim 27 wherein restarting the master agent comprises starting a new Java Virtual Machine.

* * * * *